United States Patent
Jacobsen et al.

(10) Patent No.: US 8,045,215 B2
(45) Date of Patent: Oct. 25, 2011

(54) PRINTER OBJECT LIST RESOLUTIONS

(75) Inventors: Dana A. Jacobsen, Boise, ID (US); Terry M. Fritz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2667 days.

(21) Appl. No.: 10/277,221

(22) Filed: Oct. 18, 2002

(65) Prior Publication Data
US 2004/0075849 A1 Apr. 22, 2004

(51) Int. Cl.
- G06F 15/00 (2006.01)
- G06F 3/12 (2006.01)
- G06K 1/00 (2006.01)
- G06K 15/02 (2006.01)
- H04N 1/40 (2006.01)

(52) U.S. Cl. ........ 358/1.2; 358/1.1; 358/1.11; 358/1.18; 358/296; 358/448; 358/462

(58) Field of Classification Search ............... None
See application file for complete search history.

(56) References Cited

U.S. PATENT DOCUMENTS

| | | | |
|---|---|---|---|
| 4,694,405 A | 9/1987 | Bradbury et al. | |
| 5,058,042 A | 10/1991 | Hanna et al. | |
| 5,226,098 A * | 7/1993 | Hirosawa | 382/180 |
| 5,250,940 A | 10/1993 | Valentaten et al. | |
| 5,303,334 A | 4/1994 | Snyder et al. | |
| 5,459,492 A * | 10/1995 | Venkateswar | 347/253 |
| 5,471,563 A | 11/1995 | Dennis et al. | |
| 5,542,031 A * | 7/1996 | Douglass et al. | 358/1.15 |
| 5,638,498 A * | 6/1997 | Tyler et al. | 358/1.18 |
| 5,737,501 A * | 4/1998 | Tsunekawa | 358/1.2 |
| 5,801,716 A | 9/1998 | Silverbrook | |
| 5,805,174 A * | 9/1998 | Ramchandran | 345/501 |
| 5,828,814 A | 10/1998 | Cyman et al. | |
| 5,835,122 A | 11/1998 | Oki et al. | |
| 5,841,552 A * | 11/1998 | Atobe et al. | 358/447 |
| 5,913,018 A | 6/1999 | Sela | |
| 5,946,451 A * | 8/1999 | Soker | 358/1.9 |
| 6,040,917 A | 3/2000 | Campbell et al. | |
| 6,097,496 A | 8/2000 | Papke et al. | |
| 6,359,701 B1 | 3/2002 | Yamada et al. | |
| 6,678,072 B1 * | 1/2004 | Matsuoka et al. | 358/2.1 |
| 6,731,814 B2 * | 5/2004 | Zeck et al. | 382/239 |
| 6,856,421 B1 * | 2/2005 | Amir et al. | 358/1.18 |
| 7,385,729 B2 * | 6/2008 | Clark et al. | 358/1.9 |
| 2001/0038457 A1 * | 11/2001 | Moreau et al. | 358/1.2 |
| 2002/0186382 A1 * | 12/2002 | Gonzalez et al. | 358/1.2 |
| 2003/0218762 A1 * | 11/2003 | Edwards et al. | 358/1.2 |
| 2004/0075859 A1 * | 4/2004 | Jacobsen et al. | 358/1.15 |
| 2004/0114813 A1 * | 6/2004 | Boliek et al. | 382/233 |
| 2004/0114814 A1 * | 6/2004 | Boliek et al. | 382/233 |

* cited by examiner

Primary Examiner — Chan S Park
Assistant Examiner — Vincent Peren

(57) ABSTRACT

A printer contains a list of objects to be printed under control of a controller. Different resolutions for the objects are included in the list of objects to be printed. In one embodiment, each item has an associated resolution indicating a minimum resolution for printing the item, unless the item before it has the same resolution. In such a case, the previous resolution is used to render ensuing objects for printing until an object requires a different resolution. A rendering module renders the object for printing as a function of the listed resolutions and resolutions supported by the printer. If the desired resolution is lower than that supported by the printer, the lowest resolution of the printer is used to render the object.

21 Claims, 4 Drawing Sheets

PRINTER OBJECT LIST RESOLUTIONS

FIELD OF THE INVENTION

The present invention relates to printing, and in particular to identifying the resolution of objects in an object list to be printed.

BACKGROUND OF THE INVENTION

Many printers, such as laser printers and ink jet printers, commonly receive data in page description language form before starting the printing process. With a page description language (PDL), a page is represented using graphics, text, and images that can be specified to be located anywhere on the page, and in any order, using successive commands of the language. The PDL commands reflect the way the page is composed. However, before printing, the received data must be rasterized so a page print mechanism ("print engine") in the printer can print the page while moving the print media (e.g, paper) uniformly in one direction, usually top to bottom.

Rasterization is the process of converting data that represent a page or portion of a page into a series of individual dots or pixels across the printed page to form a raster scanline, producing successive scanlines one after another down the page. The complete set of scanlines for a page is the raster data for the page. Rasterization is performed in the page printer by a rasterizer or other processor.

PDL commands for the page are converted to an intermediate representation called an "object display list" prior to rasterization. An object display list is a sequence of objects to be printed along with various print commands. The object display list is a compact representation of the page to be printed.

In many cases, a page to be printed is divided into several strips, such as horizontal strips of data. An object display list is created for each strip, which can be separately rasterized. By so dividing the page, the processing and memory requirements to provide rasterization are reduced. All the information for a particular band is contained in the display list commands for that band.

Strips contain many different types of objects to be printed, such as fonts, vectors, bit maps and others. Each strip is rendered and printed by a print engine. Rendering is normally performed to a resolution that is selected by a user. A user can enter the resolution for a page on a front panel of a printer. Higher resolutions require larger quantities of data to be rendered, which can require more time, storage and disk bandwidth. If a resolution of 1200 dpi is selected, that resolution is used for printing regardless of what is on the page. If an object having a resolution of 150 dpi raster is to be printed, it is scaled up to 1200 dpi and rendered. It is desired to minimize the amount of data that needs to be rendered.

DETAILED DESCRIPTION OF THE INVENTION

The following description and drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents. The following description is, therefore, not to be taken in a limited sense, and the scope of the present invention is defined by the appended claims.

The functions described herein are implemented in software in one embodiment, where the software comprises computer executable instructions stored on computer readable media such as memory or other type of storage devices. Further, such functions correspond to modules, which are software, hardware, firmware of any combination thereof. Multiple functions are performed in one or more modules as desired, and the embodiments described are merely examples.

Figure 1:
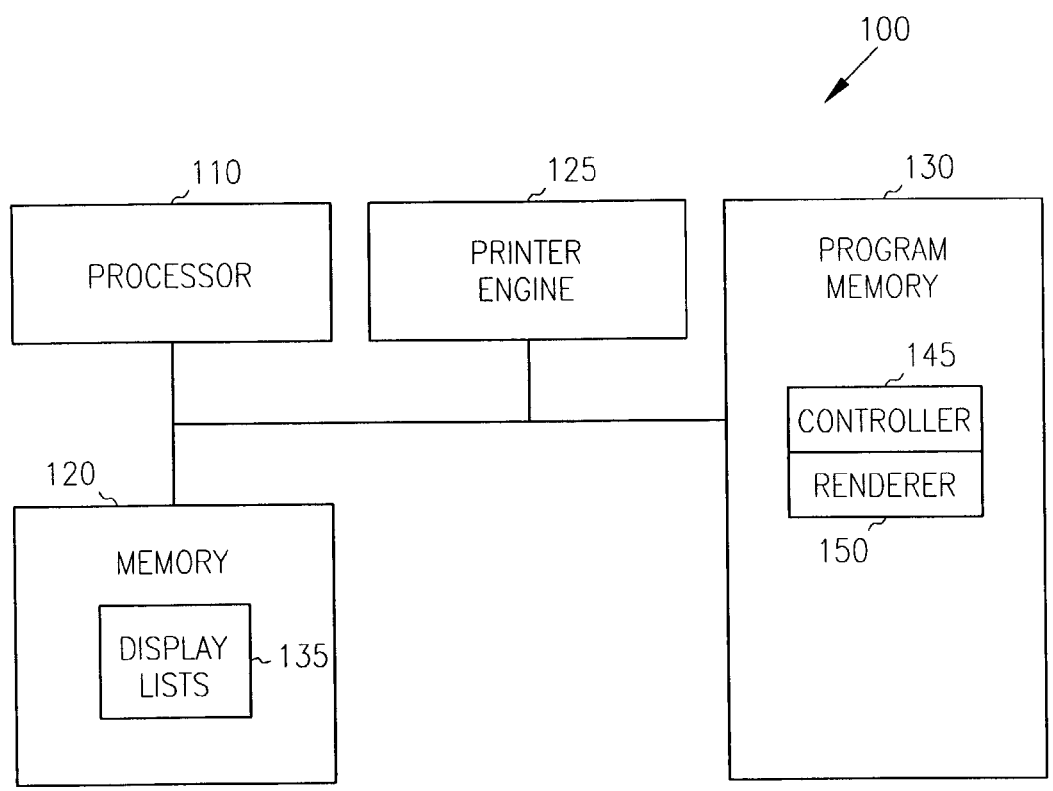
FIG. 1 is a block diagram of a controller for a printer according to an embodiment of the present invention.

A control system for a printer is shown at 100 in FIG. 1. Control system 100 comprises a processor 110 coupled to a memory 120 and a program memory 130. In some embodiments, the program memory 130 is a read only memory, while the memory 120 is a random access memory that can be both read from and written to. Many different types of memories may be utilized for both memories, and the embodiments described are not intended to be limiting.

Memory 120 is the working memory of the control system, containing information to be printed. In one embodiment, memory 120 comprises a memory area for storing object display lists 135. The memory may also store further information, such as PDL files, or other information as desired. Program memory 130 contains modules of computer instructions comprising a controller 145, and a renderer 150. Controller 145 and renderer 150 instructions are executed on processor 110 to perform functions of creating and managing object display lists, and rendering them to a raster form for printing as controlled by printer engine 125. In one embodiment, all elements of the controller 100 are integrated into a printer, such as on a circuit board within the printer. In further embodiments, the elements may be located in a separate computer system coupled to the printer. Further, the object display list 135 may be created from a received PDL by processor 110, or may be received directly from a separate computer system.

Figure 2:
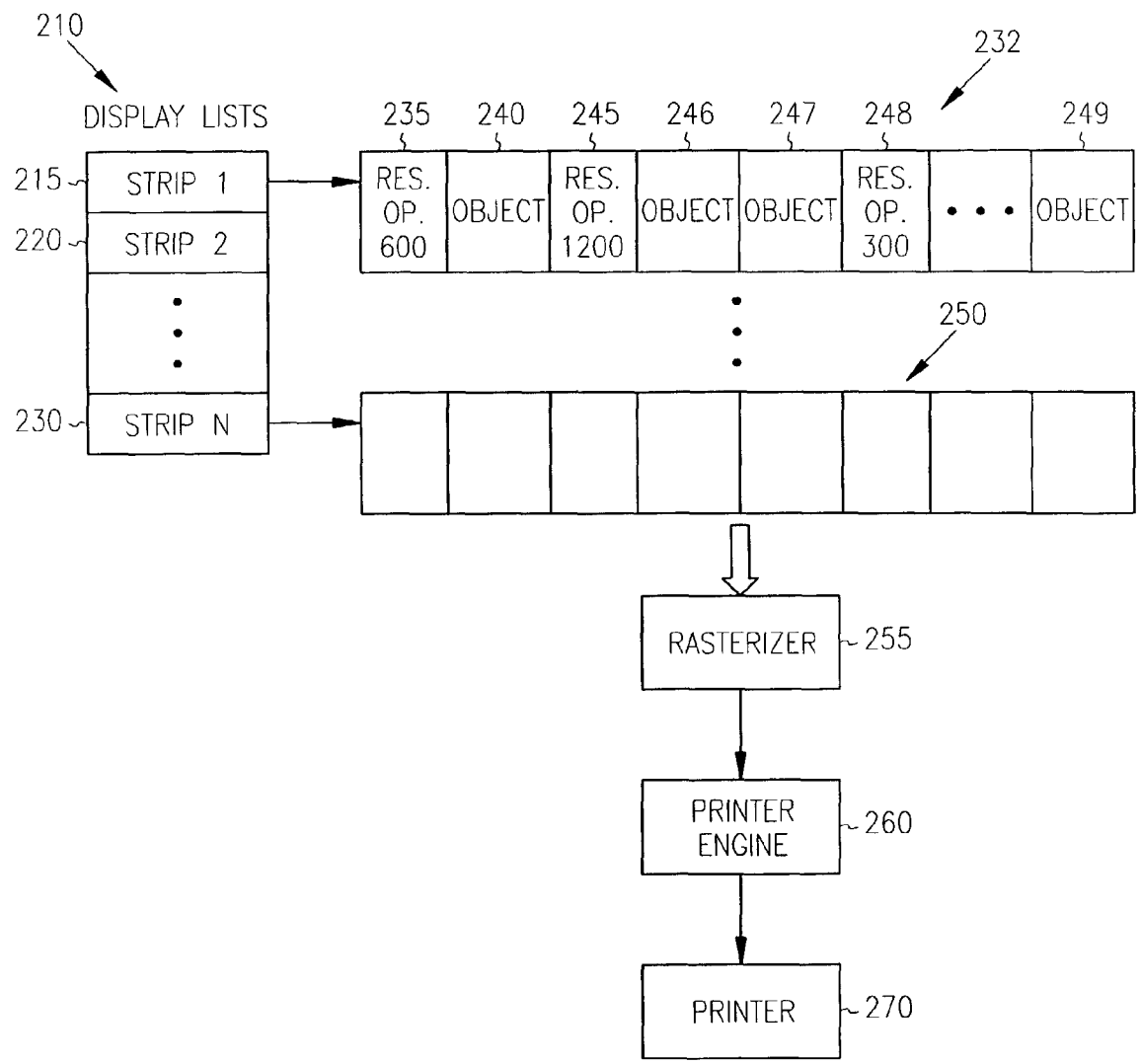
FIG. 2 is a block diagram of a object display list incorporating resolution opcodes according to an embodiment of the present invention.

FIG. 2 shows a block diagram of a page consisting of multiple strips each having an object display list at 210. Object display lists are used to identify objects to be printed. Many different types of printers, such as ink jet and laser printers utilize object display lists. In some printers, an object display list is a list of objects in a strip of a page as indicated by strip1 at 215, strip2 at 220 through stripN at 230. In one embodiment, the strip is 128 bits high, and there are approximately 50 strips per page. Pages are broken into strips to make it easier to store and print the page, and minimize requirements for printer resources.

Further detail of strip1 215 is shown in an example expanded object display list 232 starting with a resolution opcode at 235. The value of opcode 235 is 600 in this example, and corresponds to a desired resolution of 600 dots per inch (dpi) for a following object 240. At 245, another resolution opcode 245 is set to 1200. Both ensuing objects 246 and 247 in the object display list 232 are thus associated with a resolution of 1200 dpi. A further resolution opcode 248 follows object 247, and sets the desired resolution to 300 for following objects. If there are no further resolution opcodes prior to the last object in the list, object 249, all the objects ensuing from opcode 248 will have an associated resolution of 300 dpi. The expanded object display list for stripN is shown in block form at 250.

In one embodiment, the object display lists are provided to a rasterizer 255 that corresponds to the rendering module 150. The rasterizer renders each object display list to convert them to raster scans. Raster scans identify individual pixels in the strip, and are sent to a print engine 260 for printing on printer 270, or stored for later printing, possibly with compression.

Figure 3:
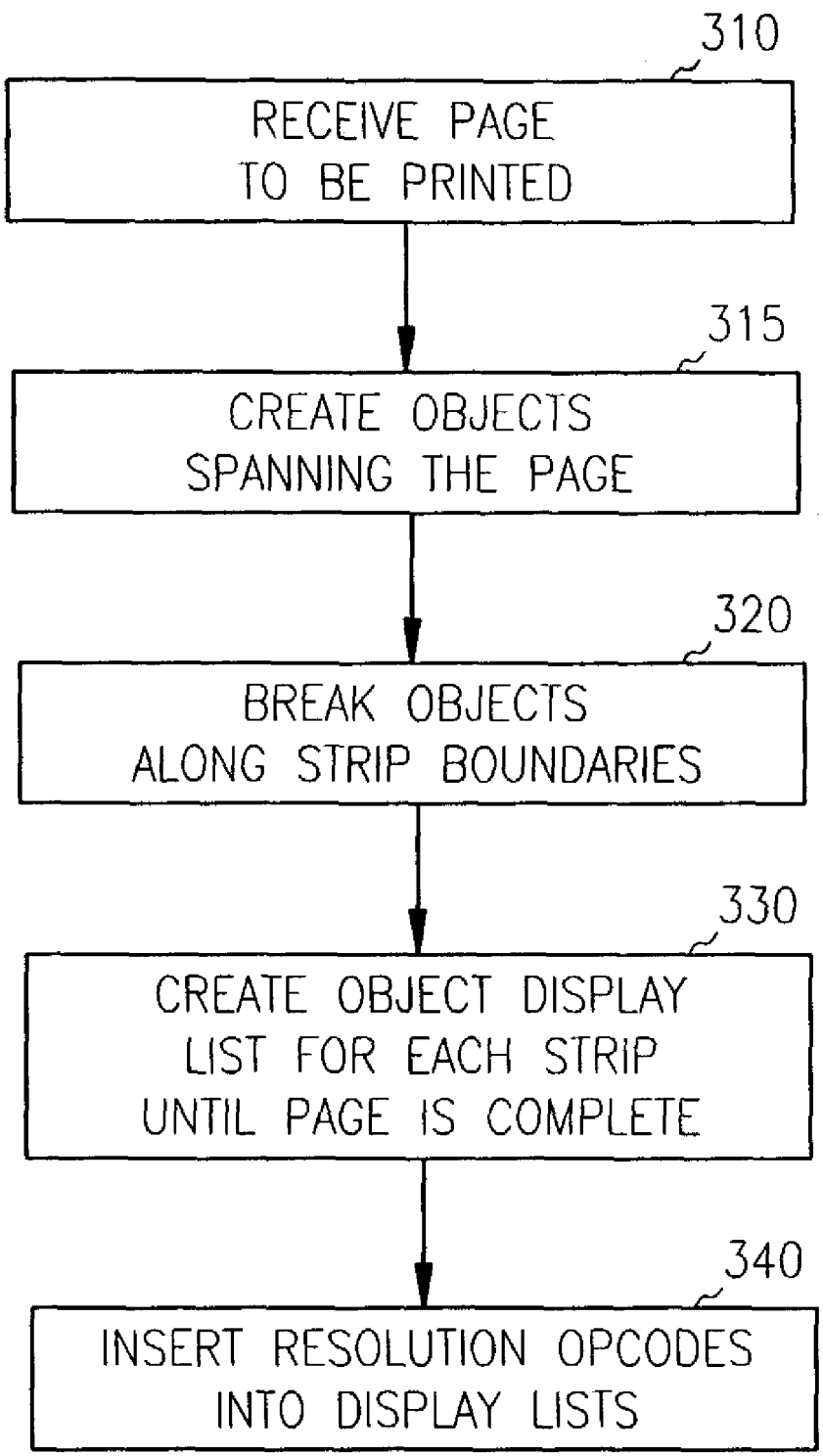
FIG. 3 is a flow chart showing functions implemented by the controller utilizing the resolution opcodes in the object display list according to an embodiment of the present invention.

FIG. 3 is a flowchart of functions to be performed to generate an object display list having different resolutions. As mentioned above, the functions need not all be integrated into a printer. In fact, generation of the object display list is performed in a separate system and provided to the printer in a further embodiment.

A page to be printed is received at 310. The page may be in the form of a printer definition language, a bit map image, or other form of page to be printed. The received page is then converted to objects that span the page at 315. The objects are then broken based on strip boundaries at 320. At 330, an object display list is created for each strip until the page is complete. Resolution Opcodes are then inserted for objects in each object display list at 340. In further embodiments, the strips are generated separately from the printer controller to minimize the resources required. Opcodes are positioned such that they can be obtained prior to rendering of the object.

As the resolution for each object is identified, if the resolution is different from the resolution for the preceding object, the new resolution opcode is inserted at 340, and is associated with the object. If the resolution for the object is the same as the resolution for the preceding object, then no new opcode is inserted.

In further embodiments, objects, such as font objects are created with a resolution already identified. Thus, when creating the object display list, resolutions are automatically available with the object. In still further embodiments, the object display list already exists, and resolutions are added to the list dependent on the types of objects in the list.

Figure 4:
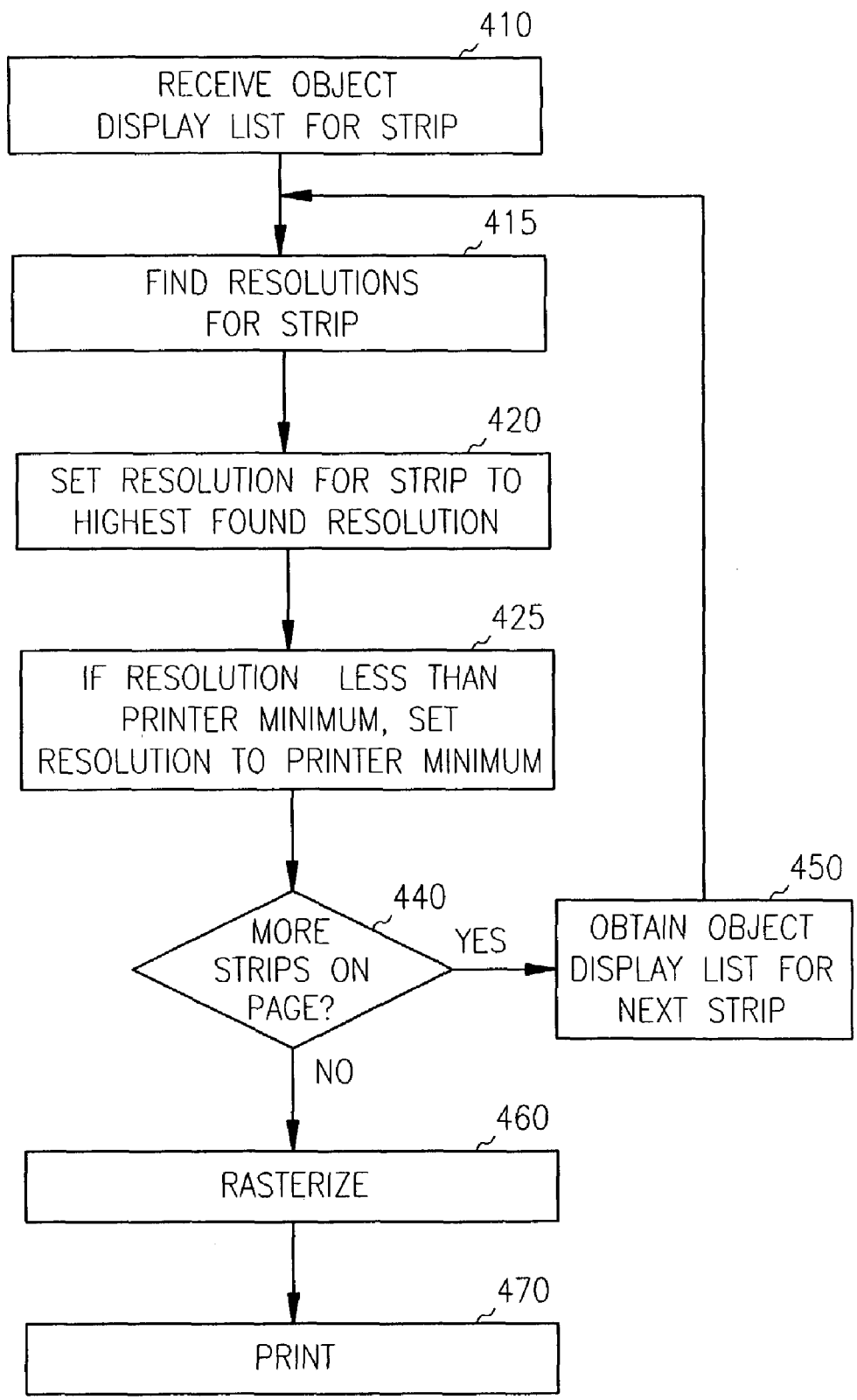
FIG. 4 is a flow chart showing functions implemented by a renderer for converting an object display list to raster data for directly printing by a print engine according to an embodiment of the present invention.

FIG. 4 illustrates the rendering process for converting an object display list to raster data for directly printing by a print engine. At 410, an object display list for a strip to be printed is received. The object display list is searched for resolution Opcodes at 415. At 420, the resolution for the strip is set to the highest found resolution. In one embodiment the highest resolution for a strip is stored and updated as objects are inserted such that 415 and 420 do not require parsing the object display list. If the resolution is less than the minimum printer resolution, the resolution is set to the minimum printer resolution at 425. If the resolution is greater than the maximum printer resolution, then the resolution is set to the maximum printer resolution at 425.

At 440, a check is made for more strips on the page to be printed. If there are more strips, the object display list for the next strip is obtained at 450, and the process is repeated for that list, starting at 415. If there were no more strips on the page, rasterization at the resulting resolution for the strip is performed at 460 for direct printing at 470. In some embodiments, rasterization and printing at 460 and 470 may occur in parallel with the resolution determinations for succeeding strips.

In one embodiment, printers supporting high resolutions, such as 2400 dpi recognize that some objects such as fonts do not need to be rendered at such a high resolution, but that a lower resolution such as 1200 dpi is sufficient. For even lower end printers, 600 dpi is likely sufficient, particularly if the renderer uses a very good scaling algorithm for fonts. In this case, a page with fonts may or may not drive up the resolution depending on the quality decided by the printer.

Most vector objects would work best at higher resolutions, and depending on halftoning methods used, the full resolution of the printer may or may not be desired. For raster objects, 600 dpi is generally considered enough if 8-bit data is preserved, while 1200 dpi or 2400 dpi is desired if the data is dithered to 1-bit.

When the strip is rasterized, the resolution that is used is the highest or largest resolution present on the object display list for the strip. In one embodiment the resolution opcodes have been limited to those resolutions allowable by the print engine, while in another embodiment any resolution is allowed and the limitation is made after the object display list is closed but before rasterization begins. The resolution chosen ensures that no object is rasterized at a lower resolution than is required for its chosen quality as well as being as small as possible such that rasterization can be performed quickly. In some embodiments the print engine cannot switch between multiple resolutions on a per-strip basis. This can be solved in one embodiment by inserting hardware scaling after the rasterization but before the print engine. In another embodiment all the strips are examined and the greatest resolution present is that chosen for all strips.

The rendered strip may be provided to the print engine and printed while other objects are still being rendered in some embodiments. In further embodiments, only full strips are provided, while in still further embodiments, an entire page is provided to the print engine. In still further embodiments, a resolution for the entire page is selected based on the required resolutions for all the strips on the page. For printers capable of varying resolution during a strip, the resolutions may be based on resolution opcodes for individual objects in the object display list.

Providing for varying resolutions in an object display list allows the smallest resolution required to be used for each strip. When lower resolutions are utilized, less time is spent rendering, and the print engine may operate faster than if all of a page were printed at a higher resolution.

The invention claimed is:

1. A controller for a printer, the controller comprising:
a processor;
a memory having an object display list of objects for a strip to be printed, the list including resolutions associated with the objects, wherein the resolutions include a first resolution and a second, different resolution, and wherein the object display list associates the first resolution with a first number of the objects, and associates the second resolution with a second, different number of the objects, wherein the object display list includes plural resolution opcodes for the respective resolutions, wherein a first of the plural resolution opcodes is placed next to the first number of objects in the object display list, and a second of the plural resolution opcodes is placed next to the second number of the objects in the object display list; and wherein the processor is configured to:
identify a largest resolution from among the resolutions in the object display list; and
rasterize the objects of the strip for printing using the identified largest resolution.

2. The controller of claim 1, wherein the processor is configured to set a resolution of the printer according to the identified largest resolution and resolutions supported by the printer.

3. The controller of claim 2 wherein the processor is configured to set the resolution of the printer to a lowest resolution of the printer if the identified largest resolution is at or less than the lowest resolution of the printer, and wherein the processor is configured to set the resolution of the printer to a maximum resolution of the printer if the identified largest resolution is greater than or equal to the maximum resolution of the printer.

4. The controller of claim 1 wherein the resolutions correspond to the resolutions for the strip.

5. The controller of claim 1 wherein the processor is configured to calculate the resolutions in the object display list based on respective types of information in the objects to be printed.

6. The controller of claim 5 wherein the processor is configured to set portions of objects with fonts to a predetermined number of dots per inch.

7. The controller of claim 6 wherein the predetermined number of dots per inch is 600.

8. The controller of claim 1 wherein at least one of the resolutions is dependent on a halftoning method used for information in the corresponding object.

9. A method of printing comprising:
checking, by a processor, resolutions integrated with an object display list of objects for a strip to be printed, wherein the resolutions include a first resolution and a second, different resolution, and wherein the object display list associates the first resolution with a first number of the objects, and associates the second resolution with a second, different number of the objects, wherein the object display list resolution opcodes for the respective resolutions wherein a first of the plural resolution opcodes is placed next to the first number of objects in the object display list, and a second of the plural resolution opcodes is placed next to the second number of the objects in the object display list;
selecting, by the processor, a particular one of the resolutions integrated with the object display list; and
rasterizing, by the processor, the objects of the object display list in accordance with the selected particular resolution.

10. The method of claim 9 further comprising printing the rasterized objects at the selected particular resolution.

11. The method of claim 9 wherein each object in the list has an associated resolution.

12. The method of claim 11 wherein the associated resolutions are represented by a value corresponding to dots per inch.

13. The method of claim 11 wherein each of the associated resolutions precedes the corresponding object to be printed, wherein the first resolution precedes the first number of the objects, and wherein the second resolution precedes the second number of the objects.

14. The method of claim 9, wherein the selected particular resolution is a largest of the resolutions integrated with the object display list.

15. A non-transitory computer readable storage medium having instructions that when executed by a processor cause the processor to:
identify resolutions specified in an object display list for corresponding objects in the object display list, wherein the resolutions include a first resolution and a second, different resolution, and wherein the object display list associates the first resolution with a first number of the objects, and associates the second resolution with a second, different number of the objects, wherein the object display list includes plural resolution opcodes for the respective resolutions, wherein a first of the plural resolution opcodes is placed next to the first number of objects in the object display list, and a second of the plural resolution opcodes is placed next to the second number of the objects in the object display list;
select a largest resolution from among the resolutions in the object display list; and
rasterize the objects in the object display list using the selected largest resolution.

16. The computer readable storage medium of claim 15 wherein rasterizing the objects comprises rasterizing at a resolution for printing the objects by a printer that is a greater of the selected largest resolution and a minimum resolution supported by the printer.

17. A method of creating an object display list for a strip to be printed, the method comprising:
receiving, by a processor, multiple objects to be printed;
associating, by the processor, a resolution with each object; and
creating, by the processor, an ordered list of objects with their associated resolutions for the strip, stored on a tangible computer readable medium, where the resolutions precede their associated objects in the ordered list of objects, and wherein successive objects with the same resolution are preceded by only one resolution, and wherein the next object in the list with a different resolution is immediately preceded by such different resolution.

18. The method of claim 17 wherein the resolution for each object is determined as a function of the type of information in the object.

19. The method of claim 17 wherein the resolutions are represented by values corresponding to dots per inch.

20. A printer comprising;
a memory to store an object display list for a strip of objects to be printed, wherein the object display list includes plural objects and associated resolutions, wherein the resolutions include a first resolution and a second, different resolution, and wherein the object display list associates the first resolution with a first number of the objects and associates the second resolution with a second, different number of the objects, wherein the object display list includes plural resolution opcodes for the respective resolutions, wherein a first of the plural resolution opcodes is placed next to the first number of objects in the list and a second of the plural resolution opcodes is placed next to the second number of the objects in the object display list; and a processor to control printing of the objects of the object display list as a function of the resolutions in the object display list, wherein the processor is to select a highest resolution from the resolutions of the object display list to use for printing the objects of the object display list.

21. The printer of claim 20, wherein the processor is to control printing of the objects in the object display list using a greater of the highest resolution and a minimum resolution of the printer.

* * * * *

UNITED STATES PATENT AND TRADEMARK OFFICE
CERTIFICATE OF CORRECTION

PATENT NO. : 8,045,215 B2
APPLICATION NO. : 10/277221
DATED : October 25, 2011
INVENTOR(S) : Dana A. Jacobsen et al.

It is certified that error appears in the above-identified patent and that said Letters Patent is hereby corrected as shown below:

In column 5, line 44, in Claim 9, delete "list resolution" and insert -- list includes plural resolution --, therefor.

In column 5, line 45, in Claim 9, delete "resolutions" and insert -- resolutions, --, therefor.

In column 6, line 53, in Claim 20, delete "comprising;" and insert -- comprising: --, therefor.

In column 6, line 60, in Claim 20, delete "objects" and insert -- objects, --, therefor.

In column 6, line 65, in Claim 20, delete "the list" and insert -- the object display list, --, therefor.

Signed and Sealed this
Nineteenth Day of June, 2012

David J. Kappos
*Director of the United States Patent and Trademark Office*